Figure 1:
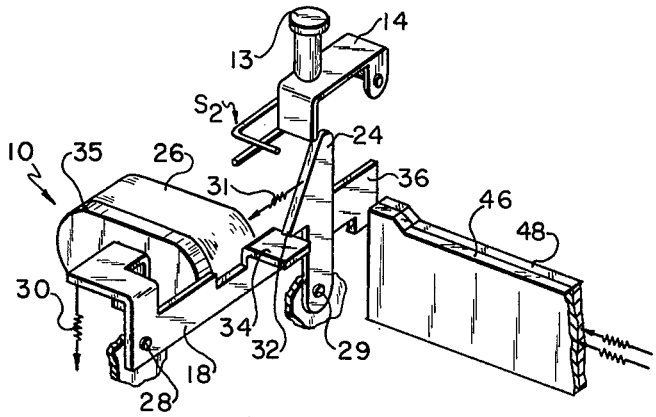
Figure 2:
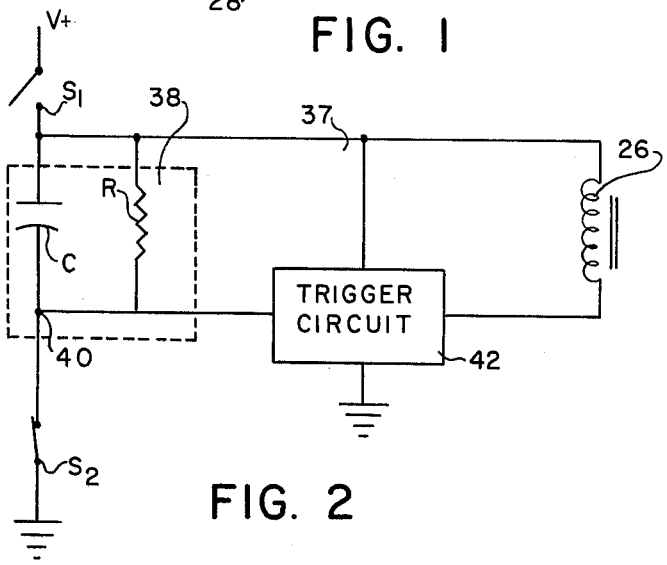
Figure 2A:
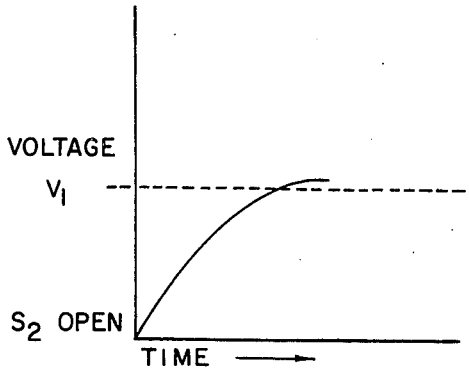
Figure 3:
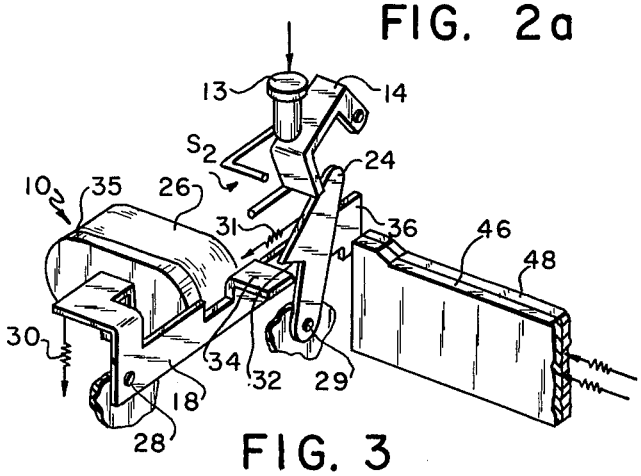
Figure 4:
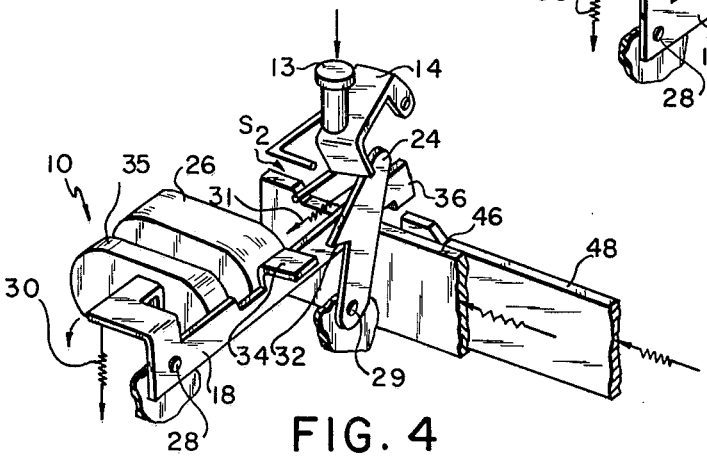

United States Defensive Publication [19] (H) [11] T961,005

Deffenbaugh [43] Aug. 2, 1977

[54] CAMERA ELECTROMAGNETIC SHUTTER RELEASE

[76] Inventor: Edmund Frank Deffenbaugh, 45 Cohasset Drive, Rochester, N.Y. 14618

[21] Appl. No.: 735,484

[22] Filed: Oct. 26, 1976

[51] Int. Cl.[2] ..... G03B 9/64

[52] U.S. Cl. ..... 354/238

[57] ABSTRACT

A shutter release mechanism for a camera uses an electromagnetic shutter latch that is operated by an exposure initiating button to delay opening movement of the shutter for a predetermined time after operation of the exposure initiating button.

2 Claims, 1 Sheet Drawing,

9 Pages Specification

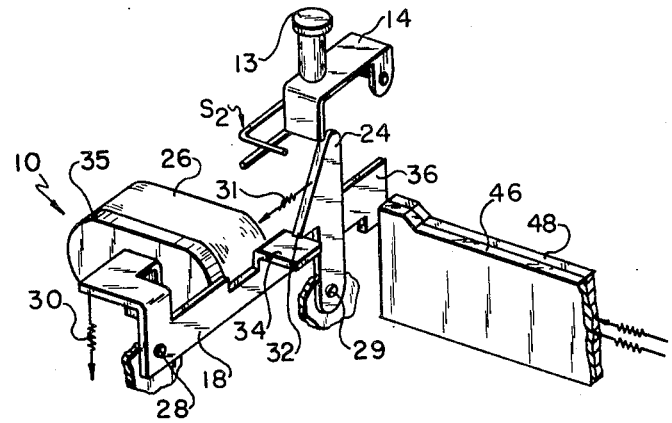

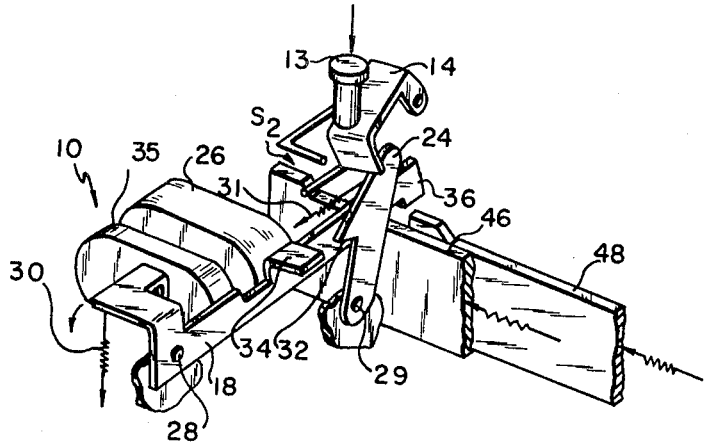

The file of this unexamined application may be inspected and copies thereof may be purchased (849 O.G. 1221, Apr. 9, 1968).